3,703,461
HYDROGENATION PROCESS AND CATALYST
Rowland C. Hansford, Yorba Linda, Calif., assignor to Union Oil Company of California, Los Angeles, Calif.
No Drawing. Continuation-in-part of applications Ser. No. 28,115, Apr. 13, 1970, now Patent No. 3,637,878, and Ser. No. 47,559, June 18, 1970, now Patent No. 3,637,484. This application July 16, 1971, Ser. No. 163,432
Int. Cl. C07c 5/10; C10g 23/04
U.S. Cl. 208—143
16 Claims

ABSTRACT OF THE DISCLOSURE

Unsaturated hydrocarbons, particularly aromatic hydrocarbons, are hydrogenated to corresponding saturated hydrocarbons, using a novel, highly active catalyst comprising platinum and/or palladium deposited by ion exchange upon certain relatively non-acidic, composites of a silica-alumina cogel or copolymer dispersed in a large-pore alumina gel matrix.

RELATED APPLICATIONS

This application is a continuation-in-part of application Ser. No. 28,115, filed Apr. 13, 1970, now Pat. No. 3,637,878, and of Ser. No. 47,559, filed June 18, 1970, now Pat. No. 3,637,484.

BACKGROUND AND SUMMARY OF THE INVENTION

There is today in the petroleum industry a steadily increasing demand for relatively non-aromatic middle distillate products boiling in the range of about 300°–700° F. Such products include for example aviation turbine fuels, diesel fuels, solvents and the like. Products in this boiling range are conventionally produced by the hydrotreating and/or hydrocracking of various refinery streams boiling in or above the desired product range. Hydrotreating and hydrocracking operations generally effect a substantial partial hydrogenation of polycyclic aromatics, but the resulting products still contain a relatively high percentage of monoaromatic hydrocarbons. Further hydrogenation of these products is desired in many cases to produce acceptable solvent products, to meet specifications (smoke point and luminometer number) for jet fuels, etc. The most active catalysts presently available for effecting this type of saturation are the noble metals, particularly platinum or palladium.

In view of the high cost of the noble metals, it is essential to use as little of such metal as possible. Efficient utilization of the metal requires a very high dispersion thereof, which explains the conventional approach of impregnating the metal salts upon high surface area supports such as alumina, silica gel or the like. However, conventional impregnation techniques rarely give more than about a 25 percent dispersion, defined as the ratio of surface (or available) metal to total metal present.

Recently, various ion-exchange procedures have been suggested as a means for obtaining a higher metal dispersion on zeolitic supports. Zeolitic supports however present an element of undesirability in connection with hydrogenation processes in which acid catalyzed reactions such as cracking and isomerization are undesired, inasmuch as the ion exchange sites on the support are potential acid centers which catalyze these undesired reactions. It has now been found that certain alumina-silica gel composites containing about 5–40 weight-percent of silica possess sufficient ion-exchange capacity to combine with the desired amount of noble metal for hydrogenation purposes, but that after drying such ion-exchange sites are either destroyed or so weakened that little or no cracking activity is apparent in the final catalyst when utilized at hydrogenation temperatures below about 700° F. The metal component however remains in a state of dispersion amounting to at least about 35–40 percent, as above defined. The resulting catalysts hence display an optimum intrinsic combination of hydrogenation activity with little or no cracking activity.

However, maximum metal dispersion on the support represents only one parameter of economy in metal utilization. The other major factor to be considered is availability of the dispersed metal. Depending upon the type of feedstock employed, the reaction temperature, the catalyst particle size, and the pore characteristics of the support, diffusion limitations may render a substantial portion of the noble metal relatively unavailable. Diffusion limitations can be overcome by utilizing finely powdered catalysts in fluidized or slurry type operations, but such contacting procedures are considerably more expensive than simple continuous flow, fixed-bed operation. But in fixed bed operations excessive pressure drops through the catalyst bed are encountered when catalyst particle size is reduced below about $\frac{1}{32}$–$\frac{1}{16}$ inch in diameter.

It has now been found that in low-temperature hydrogenations (normally liquid phase), utilizing granular catalysts of suitable size for fixed-bed operation, and wherein the noble metal is highly dispersed as herein, the pore volume and pore size characteristics of conventional supports such as silica gel or activated alumina are such that the catalyst granules are severely diffusion limited, resulting in inefficient utilization of the highly dispersed noble metal in the interior of the catalyst granules. It is found however that the unique alumina-silica support employed herein comprises an unusually high pore volume, and even more importantly a pore size distribution comprising a substantial volume of pores of diameter greater than about 500 A. The pore volume of conventional activated alumina supports normally falls in the range of about 0.6–0.8 ml./gm., giving an apparent bulk density of about 0.6–0.7 gm./ml., with only about 5–6 percent of the total pore volume being in pores of greater than 500 A. diameter. In contrast, the supports of the present invention have pore volumes in the range of about 0.8–2.0 ml./gm., with bulk densities ranging between about 0.2–0.6 gm./ml., and with at least about 15 percent, and normally at least 20 percent of the total pore volume comprising pores of greater than 500 A. diameter. The use of these high pore volume supports markedly improves the efficiency of utilization of highly dispersed noble metals in pelleted catalysts, commonly reducing the amount of metal required for a given conversion by 50 percent or more, as compared to the use of conventional low pore volume carriers.

It will thus be understood that the efficient utilization of noble metal in the present catalysts is a synergistic function of both the carrier and the ion exchange technique employed to obtain highly dispersed metal. The high pore volume carriers offer little advantage over conventional low pore volume supports if the degree of metal dispersion thereon is less than about 20 percent (on the basis of equal metal contents). The improved results shown herein hence require both a high pore volume, large pore diameter carrier, and a degree of metal dispersion exceeding about 20 percent, and preferably exceeding 30 percent.

DETAILED DESCRIPTION

(A) Alumina-silica carriers

As will be apparent from the foregoing, the two critical requirements of the carriers employed herein relate to the $Al_2O_3/SiO_2$ ratio and resultant ion-exchange capacity thereof (an indicia of cracking activity), and the pore volume and pore size characteristics thereof. The ion-exchange characteristics are a function both of the alumina/silica ratio, and the degree of interaction between the alumina and silica components. In general, it is desirable to control the $Al_2O_3/SiO_2$ ratios, and the degree of interaction thereof, so as to achieve a final composition having an ion exchange capacity between about 0.01 and 0.5, preferably between about 0.04 and 0.35 meq./gm. (as determined by ion-exchange with aqueous sodium chloride solution, followed by titration of the liberated HCl). The ion exchange capacity of conventional 85%

$$SiO_2/Al_2O_3$$

cogel cracking catalysts generally ranges between about 0.3–0.5 meq./gm.

Pure silica gel and pure alumina gel have ion exchange capacities of substantially zero as determined by sodium chloride exchange. The zeolitic properties of alumina-silica cogels hence result from the chemical interaction of the two components, and the degree of interaction as well as the $Al_2O_3/SiO_2$ ratios control the resulting ion-exchange capacity. Maximum interaction between the silica and alumina components is normally obtained by methods such as coprecipitation from aqueous solutions of sodium aluminate and sodium silicate, cogelation of mixtures of alumina hydrosol and silica hydrosol, impregnation of alumina hydrogel with silica hydrosol or the like. Mixing the preformed hydrogels of silica and alumina generally results in a lesser degree of interaction, which can however be improved by extended aging of such mixtures at elevated temperatures. If the degree of interaction is low, as in the case of mixed, separately preformed gels, or mixtures wherein the silica is intimately composited with only a portion, e.g., 1–25%, of the alumina, it is normally preferred to employ relatively high silica/alumina ratios, e.g., between about 20/80–40/60 on a dry weight basis. Conversely, where the degree of interaction is greater, the preferred ratios range between about 5/95–25/75.

The distribution of ion exchange sites in the composite support may be either homogeneous or heterogeneous, but is preferably heterogeneous. A homogeneous distribution is ordinarily obtained when the silica/alumina ratio is uniform throughout the micellar gel structure, resulting for example from conventional coprecipitation or cogelation techniques. These homogeneous supports, wherein the necessary silica content is uniformly distributed, are difficult to prepare in the large-pore, low-bulk-density forms required herein. Pure alumina on the other hand can readily be prepared in these forms, as for example by spray drying of hydrous boehmite. Hence, a preferred form of the support consists of large-pore, high-pore-volume alumina gel in which is dispersed small micelles (e.g., 10–200 microns in size) of a silica-alumina cogel or copolymer, which form is referred to herein as the "heterogeneous" support.

In the heterogeneous supports, the dispersed silica-alumina cogel or copolymer may have a high silica/alumina weight ratio, in the conventional cracking catalyst range if desired, e.g., from about 50/50 to 85/15. However, cogels and copolymers having $SiO_2/Al_2O_3$ weight ratios between about 20/80 and 50/50, or between about 85/15 and 99/1 are also contemplated. The preferred catalysts (described and claimed in my copending application Ser. No. 47,559) are those containing about 10–50%, preferably about 20–40%, by weight of a 50/50–85/15 silica-alumina gel matrix. However, catalysts containing from about 1 to 10 weight percent or about 50–75% of cogel or copolymer are also contemplated. Specifically contemplated combinations of cogel or copolymer proportions and $SiO_2/Al_2O_3$ weight ratios are as follows:

|  | Wt. percent cogel or copolymer | $SiO_2$ $Al_2O_3$ wt. ratio |
|---|---|---|
| Combination 1 | 1–10 | 20/80–99/1 |
| Combination 2 | 50–75 | 20/80–99/1 |
| Combination 3 | 10–50 | 20/80–50/50 |
| Combination 4 | 10–50 | 85/15–99/1 |

Of the foregoing, combination 4 is generally preferred, particularly a catalyst containing about 25 weight percent of a 90/10 $SiO_2/Al_2O_3$ cogel. While specific catalysts from the above groupings will differ considerably in activity, they share the common characteristic of giving a higher activity than would be obtained by using a homogeneous cogel of the same overall $SiO_2/Al_2O_3$ ratio. In general it is preferred to use larger proportions of the silica-lean cogels, and small proportions of the silica-rich cogels.

A surprising aspect of the heterogeneous supports (in which the silica is intimately composited with only a portion of the total alumina content) is that the alumina matrix appears to moderate the cracking activity of the dispersed silica-alumina cogel. Another advantage of these compositions is that the noble metal component is selectively chemisorbed on the dispersed cogel component, the alumina matrix having substantially no ion exchange capacity. The resulting compositions exhibit an apparently advantageous localized concentration of active hydrogenation centers on the dispersed silica-alumina phase. It has been found also that the dispersed silica-alumina cogel need not exhibit the large-pore structure required for the overall catalyst composite; the large pores in the surrounding alumina matrix appear to adequately overcome diffusion limitations.

TABLE 1.—PHYSICAL CHARACTERISTICS OF CARRIERS

|  | Broad range | Preferred range |
|---|---|---|
| Pore volume, ml./g | 0.8–2.0 | 1.0–2.0 |
| Bulk density, g./ml | 0.2–0.6 | 0.3–0.5 |
| Surface area: |  |  |
| m.²/g | 200–700 | 300–600 |
| m.²/ml | 100–300 | 100–250 |
| Average pore diameter, Å | 50–150 | 70–130 |
| Pore size distribution, percent of pore volume in pores of diameter greater than: |  |  |
| 100 Å | 20–80 | 25–70 |
| 500 Å | 15–60 | 20–50 |
| Pore volume (ml./g.) in pores of diameter greater than: |  |  |
| 100 Å | 0.25–1.2 | 0.4–1.0 |
| 500 Å | 0.15–1.4 | 0.3–1.0 |

Methods for the manufacture of alumin-silica carriers of the above nature are known in the art. One such method comprises aging alumina-silica cogels at a high pH of e.g., 10–12 at elevated temperatures, normally in ammoniacal media. Steaming is also a well known method of increasing average pore size (but not of total pore volume). A suitable method for preparing the heterogeneous supports involves first preparing a silica-alumina cogel cracking catalyst as described in U.S. Pat. No. 3,210,294, then mulling and homogenizing the resulting hydrogel with excess alumina hydrogel, followed by spray drying of the resulting mixture. In still another method, a high-silica cogel, or "graft copolymer," is first prepared by impregnating silica-hydrogel with an aluminum salt followed by precipitation of alumina gel with ammonium hydroxide. The resulting composition is then washed, blended with additional alumina hydrogel, mixed thoroughly and homogenized, followed by spray-drying and re-mulling with added water, after which the mixture is extruded into suitable pellets. Any other suitable method may be employed to obtain the desired pore structure and surface area characteristics.

Prior to addition of the noble metal, the carrier is preferably (though not necessarily) formed into pellets of the desired size, normally at least 1/32-inch in diameter. The term "pellets" is intended to include extrudates, prills, beads, or any other suitable granular form.

(B) Addition of noble metal

In accordance with the invention, the foregoing carriers are advantageously ion-exchanged with an aqueous solution of a complex tetramminohydroxide of one or more of the metals platinum or palladium, to incorporate the metal thereon in the form of a complex cation, after which the exchanged pellets are drained, dried and calcined. The preferred tetramminohydroxide compounds include the following:

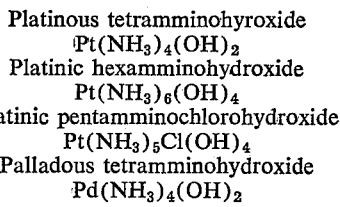

Platinous tetramminohydroxide
Pt(NH$_3$)$_4$(OH)$_2$
Platinic hexamminohydroxide
Pt(NH$_3$)$_6$(OH)$_4$
Platinic pentamminochlorohydroxide
Pt(NH$_3$)$_5$Cl(OH)$_4$
Palladous tetramminohydroxide
Pd(NH$_3$)$_4$(OH)$_2$ The above compounds (hereinafter termed "complex hydroxides") can be conveniently prepared by methods described in U.S. Pat. No. 2,773,742. Use of the complex hydroxides is advantageous in directing the exchange of the complex metal cation into the acidic exchange sites associated with the silica component of the carrier, while at the same time the hydrogen ions exchanged out of the carrier react with the hydroxyl groups of the complex hydroxides to form water. When other complex metal compounds are employed wherein the metal appears in the cation, e.g., platinous tetramminochloride, hydrogen chloride is formed as a by-product of the exchange, resulting in lowering of the pH of the solution, contamination of the solution with extraneous anions, and incomplete exchange of noble metal. It is necessary in such cases to add sufficient base such as ammonium hydroxide to keep the pH of the solution above about 10. The complex hydroxide compounds however are strongly alkaline in themselves and will raise the pH of the exchange solution to 12 or more, so that it is unnecessary to add another base in order to obtain complete ion exchange. By using the complex hydroxides, a substantially quanitative exchange of metal into the carrier is obtained, and the exchange occurs selectively at the exchange sites associated with the silica component of the carrier.

A surprising aspect of the present invention is the improved hydrogenation activity obtained by ion exchange with the complex metal hydroxides, as compared to catalysts wherein an equal degree of metal dispersion is obtained by other ion exchange procedures. For example, it has been found that the carriers of this invention can be exchanged with solutions of chloroplatinic acid (wherein the platinum appears in the anion) and after calcining, the resulting catalysts display substantially equal metal dispersion as is obtained with the complex hydroxides. It appears however that the chloroplatinic anion combines selectively with the alumina component of the carrier, resulting in a catalyst of substantially lower activity.

The concentration of complex metal hydroxide in the exchange solution can be adjusted according to the desired amount of metal to be placed on the carrier. Since the exchange is substantially quantitative, it is normally desirable to employ relatively dilute exchange solutions in order to facilitate uniformity of exchange throughout the carrier. It is generally desirable to employ solutions in the concentration range of about 0.001–0.2 M, and to use about 2–10 ml. of such solutions per gm. of carrier. The exchange is complete when hydrogen sulfide fails to discolor a small sample of the solution. Ordinarily the exchange is complete in less than about 2 hours, but it may be desirable in some cases to allow the mixture to stand for several hours longer in order to permit uniform distribution of the exchanged metal throughout the pellets.

The exchanged catalyst pellets are drained from the spent exchange solution, dried at e.g., 200–250° F. for 3–4 hours, and then calcined if desired in dry air at temperatures of e.g., 600°–1200° F. for about 6–20 hours. However, the calcination step is normally undesirable since catalysts of much higher activity result from drying to a moisture content of 3–10 percent by weight at temperatures below 700° F. An optimum drying procedure consists in heating the catalyst in circulating air, or on a belt drier, at temperatures in the range of about 450–700° F., while maintaining sufficient air circulation to complete the drying in as short a time as possible, preferably about 30 minutes to 5 hours. It has been found that catalysts dried at 500° F. with sufficent air circulation to complete the drying in 5 hours are almost 50% more active than catalysts dried at the same temperature over a period of 8 hours. It has also been found that temperatures above about 500° F. are detrimental to catalysts which contain more than about 0.3 weight-percent of residual sulfate ion (from the aluminum sulfate used in the manufacture of the support).

Prior to use in the hydrogenation process, it is normally desirable to reduce the dried and/or calcined catalyst in hydrogen at temperatures of e.g., 400°–1000° F. for several hours.

Desirable concentrations of noble metal in the finished catalysts range between about 0.01 and 2 weight-percent, preferably between about 0.1 and 1 percent.

(C) Hydrogenation conditions

The hydrogenation conditions employed herein are substantially conventional, with the exception that the very high activity of the catalyst often permis the use of higher space velocities and/or lower temperatures than are normally employed. Under the preferred conditions of temperature, pressure and feedstocks, the operation is substantially liquid phase, the preferred mode of operation being a conventional fixed bed type wherein the feed plus hydrogen is preheated and passed downwardly through one or more beds of the catalyst. Suitable hydrogenation conditions are summarized as follows:

TABLE 2.—HYDROGENATION CONDITIONS

|  | Broad range | Preferred range |
| --- | --- | --- |
| Temperature, ° F | 250–700 | 350–600 |
| Pressure, p.s.i.g | 150–2,000 | 400–1,500 |
| LHSV | 1–20 | 2–12 |
| H$_2$/oil, MSCF/B | 3–20 | 5–12 |

Those skilled in the art will readily understand that the above conditions are suitably correlated to effect the desired degree of hydrogenation with reference to the particular feedstock. Normally, it is also desirable to correlate temperature and space velocity to minimize cracking specifically to avoid converting more than about 1 percent of the feed to products boiling below the initial boiling point of the feed.

(D) Feedstocks

The process may be applied advantageously to the hydrogenation of substantially any individual aromatic hydrocarbon, mixtures thereof, or mineral oil fractions boiling in the range of about 100°–1000° F. Benzene may be converted to cyclohexane, and toluene to methylcyclohexane. Preferred feedstocks comprise mineral oil fractions boiling in the solvent naphtha, turbine fuel or diesel fuel ranges, and which normally contain up to about 50–60 volume percent of aromatic hydrocarbons. Specifically contemplated feeds comprise solvent fractions boiling in the range of about 300°–400° F., turbine fuel fractions boiling in the range of about 300°–550° F., and the like. The process may be advantageously applied to reduce the aromatic content of such feeds to below about 5 volume percent, and below 1 percent if desired.

Another advantageous feature of the catalysts of this invention is their increased tolerance to sulfur. As is well known, most noble metal catalysts are poisoned by sulfur compounds, but it is found that the present catalysts can be advantageously utilized to hydrogenate feeds containing from 10–100 parts per million of sulfur or more.

The following examples are cited to illustrate the critical aspects of the invention, but are not to be construed as limiting in scope:

EXAMPLE I

A preferred catalyst (designated catalyst "A") of the present invention was prepared as follows:

A solution of tetramminopolatinous chloride was prepared by dissolving 5.4 gms. of $Pt(NH_3)_4Cl_2 \cdot H_2O$ in 2000 ml. of deionized water, and the resulting solution was percolated downwardly through a 500 ml. bed of freshly regenerated (hydroxide) Amberlite IRA–400 resin at the rate of 100 ml./minute. The bed was then flushed with 500 ml. of deionized water and the wash water was combined with the main 2000 ml. of solution, to which was also added 25 ml. of 28% $NH_3$ solution.

To the resulting 0.006 M solution of $Pt(NH_3)_4(OH)_2$ was then added 500 gms. of a freshly calcined, extruded (1/16-inch) 80% alumina–20% silica heterogeneous cogel carrier prepared by mulling about 27 parts by dry weight of a 75/25 silica-alumina "graft copolymer" (alumina precipitated via aluminum sulfate solution into the pores of a preformed silica gel) with 73 parts by dry weight of hydrous alumina gel, followed by spray drying, rehomogenization with added water, and extrusion. The resulting carrier had the following properties after calcination at 600° C.:

TABLE 3

| | |
|---|---|
| Pore volume, ml./g. | 1.19 |
| Bulk density, g./ml. | 0.40 |
| Surface area: | |
| $M.^2/g.$ | 352 |
| $M.^2/ml.$ | 141 |
| Percent pore volume in pores of diameter greater than, A.: | |
| 1000 | 30.5 |
| 500 | 36.4 |
| 100 | 51.3 |
| Pore volume (ml./g.) in pores of diameter greater than, A.: | |
| 1000 | 0.36 |
| 500 | 0.43 |
| 100 | 0.61 |
| Ion exchange capacity, meq./g. | 0.24 |

The resulting mixture was shaken gently every 5–10 minutes over a period of about 2 hours, and then allowed to stand for 12 hours. The spent exchange solution was free of platinum. The exchanged pellets were then drained, dried at 110° C. for about 3 hours and calcined in dry air at 480° C. for 12 hours. The resulting catalyst contained 0.56 weight-percent Pt in a state of 43% dispersion, and had a bulk density of 0.40 g./ml.

EXAMPLE II

Another, relatively non-preferred catalyst (designated "B") of the present invention was prepared substantially as described in Example I, utilizing as the carrier an intermediate pore volume, extruded, 80% alumina-20% silica heterogeneous cogel carrier prepared as described in Example I, except that a lower pore volume alumina gel was employed, the resulting composition having the following characteristics:

TABLE 4

| | |
|---|---|
| Pore volume, ml./g. | 0.96 |
| Bulk density, g./ml. | 0.50 |
| Surface area: | |
| $M.^2/g.$ | 487 |
| $M.^2/ml.$ | 239 |
| Percent pore volume in pores of diameter greater than, A.: | |
| 1000 | 23.4 |
| 500 | 25.0 |
| 100 | 32.3 |
| Pore volume (ml./g.) in pores of diameter greater than, A.: | |
| 1000 | 0.225 |
| 500 | 0.24 |
| 100 | 0.31 |
| Ion exchange capacity, meq./g. | 0.3 |

The resulting catalyst contained 0.573 weight-percent of Pt in a state of 32 percent dispersion, and had a bulk density of 0.50 g./ml.

EXAMPLE III

For purposes of comparison, another catalyst, "C," was prepared, using the same high pore volume carrier of Example I, but wherein the platinum was added by impregnation and/or ion-exchange with an aqueous solution of chloroplatinic acid ($H_2PtCl_6$). The resulting catalyst contained 0.463 weight-percent Pt in a state of 59 percent dispersion, and had a bulk density of 0.45 g./ml.

EXAMPLE IV

For further comparison, a highly active commercial reforming catalyst (designated "D") containing 0.55 weight-percent Pt (48 percent dispersion) impregnated via chloroplatinic acid on a mixed, eta-gamma alumina carrier was obtained, and its pore characteristics determined as follows:

TABLE 5

| | |
|---|---|
| Pore volume, ml./g. | 0.51 |
| Bulk density, g./ml. | 0.765 |
| Surface area: | |
| $M.^2/g.$ | 372 |
| $M.^2/ml.$ | 284 |
| Percent pore volume in pores of diameter greater than, A.: | |
| 1000 | 15.1 |
| 500 | 25.3 |
| 100 | 39.0 |
| Pore volume (ml./g.) in pores of diameter greater than, A.: | |
| 1000 | 0.077 |
| 500 | 0.13 |
| 100 | 0.20 |

EXAMPLE V

Each of the foregoing catalysts was then tested for hydrogenation activity, using as the feed a hydrofined petroleum jet-fuel fraction having the following characteristics:

| | |
|---|---|
| Gravity, ° API | 39.2 |
| Boiling range, Engler D–86, ° F.: | |
| Initial | 288 |
| 10% | 311 |
| 50% | 390 |
| Max. | 548 |
| Nitgogen, p.p.m. | 0.3 |
| Sulfur, p.p.m. | 4.0 |
| Volume-percent: | |
| Aromatics | 36 |
| Olefins | 0 |
| Saturates | 64 |

Hydrogenation conditions were as follows:

Temperature, °F. ........................................... 500
LHSV ....................................................... 8
Pressure, p.s.i.g. ......................................... 600
$H_2$/oil M s.c.f./b ....................................... 6

The significant results of the test runs were as follows:

TABLE 6.—VOLUME-PERCENT AROMATICS IN PRODUCT

| Catalyst | A | B | C | D |
|---|---|---|---|---|
| Hours on stream: | | | | |
| 18 | 2.2 | 5.1 | 6.5 | 5.7 |
| 30 | 2.7 | 4.8 | 7.8 | 6.8 |
| 42 | 3.0 | 5.4 | 9.8 | 8.0 |
| 54 | | 5.6 | 11.0 | 9.0 |
| 66 | | 6.3 | 11.6 | 10.0 |
| 78 | | 6.4 | 10.5 | 10.8 |

Assigning an arbitrary activity of 100 to Catalyst D for each portion of the run, the relative volume activities of the respective catalysts are as follows:

TABLE 7.—RELATIVE VOLUME ACTIVITIES

| Catalyst | A | B | C | D |
|---|---|---|---|---|
| Hours on stream: | | | | |
| 18 | 256 | 111 | 87 | 100 |
| 30 | 253 | 141 | 87 | 100 |
| 42 | 267 | 148 | 82 | 100 |
| 54 | | 160 | 82 | 100 |
| 66 | | 159 | 86 | 100 |
| 78 | | 168 | 103 | 100 |

The foregoing volume activities does not however reflect the efficiency of utilization of the platinum content of the respective catalysts. Some indication of this factor can be obtained by dividing the foregoing activities by the weight of platinum per 100 ml. (determined by multiplying weight-percent Pt times bulk density) of the respective catalysts, giving the following figures for relative efficiency of platinum utilization:

TABLE 8.—RELATIVE EFFICIENCY OF PLATINUM UTILIZATION

| Catalyst | A | B | C | D |
|---|---|---|---|---|
| Hours on stream: | | | | |
| 18 | 1,142 | 383 | 415 | 227 |
| 30 | 1,130 | 486 | 415 | 227 |
| 42 | 1,192 | 510 | 390 | 227 |
| 54 | | 550 | 390 | 227 |
| 66 | | 548 | 410 | 227 |
| 78 | | 580 | 490 | 227 |

From the foregoing it is apparent that the high pore volume catalysts A, B, and C are much superior to the conventional low pore volume catalyst D. Catalyst C, prepared by impregnation with chloroplatinic acid, was initially about equal in volume activity to catalyst B (prepared according to the present invention), but deactivated much more rapidly. The marked superiority of high-pore-volume catalyst A over intermediate-pore-volume catalyst B is also readily apparent.

In all of the foregoing runs, there was less than 1 percent conversion to products boiling below the initial boiling point of the feed.

EXAMPLE VI

To demonstrate the superior sulfur tolerance of the catalysts of this invention, two parallel runs were carried out using a sulfur-containing solvent naphtha feed having the following characteristics:

Gravity, °API ............................................. 49.8
Engler distillation ....................................... [1] 290-386
Sulfur, p.p.m. ............................................ 73
Aromatics, vol.-percent ................................... 19
Saturates ................................................. 81

[1] IBP/max.

Conventional catalyst D described above was compared with a high pore volume catalyst E, which was essentially identical to catalyst A above, except that the Pt content was 0.6 weight-percent and its pore volume was 1.43 ml./g. (bulk density=0.37 g./ml.).

Process conditions were selected to achieve substantially complete initial aromatics saturation with each of the fresh catalysts as follows:

Temperature, °F. .......................................... 600
Pressure, p.s.i.g. ........................................ 1100
LHVS ...................................................... 2.3
$H_2$/oil, M s.c.f./b. .................................... 5430

Over the 700-hour run, aromatics saturation remained substantially complete with catalyst E, but declined with catalyst D, as follows:

TABLE 9.—VOLUME-PERCENT AROMATICS IN PRODUCT

| Catalyst | E | D |
|---|---|---|
| Hours on stream: | | |
| 0 | 0.1 | 0.2 |
| 100 | 0.1 | 0.5 |
| 200 | 0.0 | 0.9 |
| 400 | 0.0 | 2.5 |
| 600 | 0.0 | 3.5 |
| 700 | 0.0 | 3.8 |

The superior sulfur-tolerance of catalyst E is readily apparent.

EXAMPLE VII

To demonstrate the effect of silica content, another catalyst was prepared essentially as described in Example I, with the exception that the proportion of 75/25 silica-alumina "graft copolymer" was halved, resulting in a final composition containing 10 weight-percent $SiO_2$ and having an ion exchange capacity of 0.13 meq./g. An aromatics hydrogenation test run showed that this catalyst had only about 60% of the activity of the 20% $SiO_2$ catalyst of Example I.

EXAMPLES VIII–XI

Using conventional silica-alumina cogels (prepared by coprecipitation from aluminum sulfate-sodium silicate mixtures) dispersed in the large-pore alumina gel of Example I, the following catalysts display excellent hydrogenation activities when prepared by the ion-exchange procedure of Example I to give 0.5 weight-percent Pt on each catalyst:

| Catalyst | F | G | H | J |
|---|---|---|---|---|
| Weight-percent cogel | 8 | 60 | 40 | 12 |
| $SiO_2$/$Al_2O_3$ weight ratio in cogel | 90/10 | 30/70 | 40/60 | 87/13 |
| Weight-percent $SiO_2$ in composite carrier | 7.2 | 18 | 16 | 10.4 |

In each case, the hydrogenation activity is higher than that of an analogous catalyst wherein the same overall proportion of silica is uniformly distributed as a cogel with the total alumina content.

EXAMPLE XII

A homogeneous, 20% $SiO_2$–80% $Al_2O_3$ cogel base was prepared by conventional methods, and after extruding, drying and calcining was found to have the following properties:

TABLE 10

Pore volume, ml./g. ....................................... 1.20
Bulk density, g./ml. ...................................... 0.42
Surface area:
    $M.^2$/g. ............................................. 385
    $M.^2$/ml. ............................................ 161
Percent pore volume in pores of diameter greater than, A.:
    1000 .................................................. 10.8
    500 ................................................... 16.7
    100 ................................................... 44.0
Pore volume (ml./g.) in pores of diameter greater than, A.:
    1000 .................................................. 0.13
    500 ................................................... 0.20
    100 ................................................... 0.52
Ion exchange capacity, meq./g. ............................ 0.195

After adding 0.57 weight-percent of Pt as described in Example I, the resulting catalyst had a Pt dispersion of 57 percent, but was found to be only about 85 percent as active for hydrogenation as the catalyst of Example I, thus showing that the lack of sufficient pore volume in the >500 A. size range prevents full utilization of the active centers in the catalyst. It is apparent that adequate silica content, ion-exchange capacity, and Pt dispersion are not alone sufficient to give the desired bulk volume activity.

It is not intended that the invention should be limited to non-essential details described above; the following claims and their obvious equivalents are intended to define the true scope of the invention:

I claim:

1. A pelleted catalyst composition having a high activity for the hydrogenation of aromatic hydrocarbons, which comprises:
   (1) a heterogeneous composite carrier of a silica-alumina cogel or copolymer dispersed in a large-pore alumina gel matrix, the composite carrier having a surface area between about 200 and 700 m.$^2$/g., and a pore volume of about 0.8–2 ml./g., with about 0.3–1 ml./g. of said pore volume being in pores of diameter greater than 500 A., the proportion of said cogel or copolymer and its $SiO_2/Al_2O_3$ weight ratio being within one of the following range combinations:

|  | Wt. percent cogel or copolymer | $SiO_2/Al_2O_3$ wt. ratio |
|---|---|---|
| Combination 1 | 1–10 | 20/80–99/1 |
| Combination 2 | 50–75 | 20/80–99/1 |
| Combination 3 | 10–50 | 20/80–50/50 |
| Combination 4 | 10–50 | 85/15–99/1 | and
   (2) dispersed on said composite carrier a platinum group metal originally deposited thereon by ion exchange from an aqueous solution of a platinum group metal compound wherein the platinum group metal appears in the cation.

2. The catalyst composition as defined in claim 1 wherein said platinum group metal compound is selected from the group consisting of platinous tetramminohydroxide, platinic hexamminohydroxide, platinic pentammino chlorohydroxide, and palladous tetramminohydroxide.

3. The catalyst composition as defined in claim 1 wherein the composite carrier has a bulk density between about 0.2 and 0.6 gm./ml.

4. A catalyst composition as defined in claim 1 wherein said platinum group metal is platinum, and wherein said composite carrier contains about 1–10 weight-percent of a silica-alumina cogel or copolymer having a $SiO_2/Al_2O_3$ weight ratio between about 20/80 and 99/1.

5. A catalyst composition as defined in claim 1 wherein said platinum group metal is platinum, and wherein said composite carrier contains about 50–75 weight-percent of a silica-alumina cogel or copolymer having a $SiO_2/Al_2O_3$ weight ratio between about 20/80 and 99/1.

6. A catalyst composition as defined in claim 1 wherein said platinum group metal is platinum, and wherein said composite carrier contains about 10–50 weight-percent of a silica-alumina cogel or copolymer having a $SiO_2–Al_2O_3$ weight ratio between about 20/80 and 50/50.

7. A catalyst composition as defined in claim 1 wherein said platinum group metal is platinum, and wherein said composite carrier contains about 10–50 weight-percent of a silica-alumina cogel or copolymer having a $SiO_2/Al_2O_3$ weight ratio between about 85/15 and 99/1.

8. A process for the hydrogenation of an aromatic hydrocarbon feedstock which comprises contacting said feedstock under hydrogenation conditions including a temperature between about 400° and 700° F. and at an elevated pressure in the presence of added hydrogen with an alumina-silica supported platinum group metal catalyst, said catalyst comprising:
   (1) a heterogeneous composite carrier of a silica-alumina cogel or copolymer dispersed in a large-pore alumina gel matrix, the composite carrier having a surface area between about 200 and 700 m.$^2$/g., and a pore volume of about 0.8–2 ml./g., with about 0.3–1 ml./g. of said pore volume being in pores of diameter greater than 500 A., the proportion of said cogel or copolymer and its $SiO_2/Al_2O_3$ weight ratio being within one of the following range combinations:

|  | Wt. percent cogel or copolymer | $SiO_2/Al_2O_3$ wt. ratio |
|---|---|---|
| Combination 1 | 1–10 | 20/80–99/1 |
| Combination 2 | 50–75 | 20/80–99/1 |
| Combination 3 | 10–50 | 20/80–50/50 |
| Combination 4 | 10–50 | 85/15–99/1 | and
   (2) dispersed on said composite carrier a platinum group metal originally deposited thereon by ion exchange from an aqueous solution of a platinum group metal compound wherein the platinum group metal appears in the cation.

9. The process as defined in claim 8 wherein said platinum group metal compound is selected from the group consisting of platinous tetramminohydroxide, platinic hexamminohydroxide, platinic pentammino chlorohydroxide, and palladous tetramminohydroxide.

10. The process as defined in claim 8 wherein the composite carrier has a bulk density between about 0.2 and 0.6 gm./ml.

11. The process as defined in claim 8 wherein the hydrogenation temperature is between about 500° and 650° F.

12. The process as defined in claim 8 wherein the hydrogenation pressure is between about 150 and 2000 p.s.i.g.

13. The process as defined in claim 8 wherein said platinum group metal is platinum, and wherein said composite carrier contains about 10–50 weight-percent of a silica-alumina cogel or copolymer having a $SiO_2/Al_2O_3$ weight ratio between about 20/80 and 99/1.

14. The process as defined in claim 8 wherein said platinum group metal is platinum, and wherein said composite carrier contains about 50–75 weight-percent of a silica-alumina cogel or copolymer having a $SiO_2/Al_2O_3$ weight ratio between about 20/80 and 99/1.

15. The process as defined in claim 8 wherein said platinum group metal is platinum, and wherein said composite carrier contains about 10–50 weight-percent of a silica-alumina cogel or copolymer having a $SiO_2/Al_2O_3$ weight ratio between about 20/80 and 50/50.

16. The process as defined in claim 8 wherein said platinum group metal is platinum, and wherein said composite carrier contains about 10–50 weight-percent of a silica-alumina cogel or copolymer having a $SiO_2/Al_2O_3$ weight ratio between about 85/15 and 99/1.

References Cited

UNITED STATES PATENTS

| 2,721,226 | 10/1955 | Ciapetta et al. | 208—143 |
| 3,432,565 | 3/1969 | Kouwenhoven et al. | 208—143 |
| 3,491,019 | 11/1970 | Pollitzer et al. | 260—667 |
| 3,516,927 | 6/1970 | Jaffee | 260—667 |

HERBERT LEVINE, Primary Examiner

U.S. Cl. X.R.

252—455 R; 260—667